United States Patent Office 3,684,562
Patented Aug. 15, 1972

3,684,562
TREATMENT OF LIGHT-WEIGHT, NON-WOVEN POLYOLEFIN FABRICS
George Pascall, Rawdon, Montcalm, Quebec, Canada, assignor to John A. Pinatel, Joliette, Quebec, Canada
No Drawing. Filed July 29, 1970, Ser. No. 59,362
Int. Cl. B44d 1/09, 1/14
U.S. Cl. 117—111                              4 Claims

ABSTRACT OF THE DISCLOSURE

A process is described for treating a lightweight, non-woven polyolefin fabric having a weight of about 1–1.3 ounces per square yard to make it receptive to treating agents. To one surface of the fabric there is applied a very thin layer of a curable composition containing (a) a low curing temperature, flexible polymerizable resin comprising a mixture of vinyl and acrylic type resin lattices which is non-tacky when cured and is receptive to treating agents and (b) a vinyl ether copolymer as an adhesion improver. The composition is applied at a Brookfield viscosity of about 9,000 to 12,000 in an amount of about ½ to 2 ounces of solids per square yard of fabric by means of a screen engraved roller.

BACKGROUND OF THE INVENTION

(1) Field of the invention

This invention relates to a process for treating light-weight, non-woven polyolefin fabrics and to the fabrics thus produced.

(2) Description of the prior art

Light-weight, non-woven polyolefin fabrics have come into very widespread use and provide an excellent disposible material showing extremely good strength characteristics. This makes it possible to use these non-woven fabrics for many purposes for which other disposable type fabrics cannot be used because of insufficient strength.

However, one of the disadvantages of these light-weight non-woven polyolefin fabrics is that because of the nature of the polyolefin, it is extremely difficult to apply coloring to the fabric or to treat it with other materials such as oil and stain repellents. Such materials have been applied with some success by usual techniques, but the amounts of materials required and the difficulties encountered make such treatment totally uneconomical for use in the disposable garment and fabric industry.

It is, therefore, the object of the present invention to provide a light-weight, non-woven polyolefin fabric which is treated in such a manner that it will readily accept additional treatments such as coloring, oil and stain repellency, etc.

SUMMARY OF THE INVENTION

According to this invention, a light-weight, non-woven polyolefin fabric has applied to the surface thereof a very thin layer of a low curing temperature, flexible polymerizable resin which is non-tacky when cured and which is receptive to other treating agents. This polymerizable resin also includes an adhesion improver, such as a vinyl ether copolymer.

The polymerizable resin with adhesion improver is laid down on the fabric as a very thin layer in amounts of about one-half ounce to two ounces of solids per square yard of fabric being treated. In order to lay down this very thin layer uniformly across the fabric, it has been found to be particularly advantageous to use a screen engraved roller having about 36 perforations per inch with these perforations having a depth of about 5 to 10 thousandths of an inch.

The laying down of a very thin layer of receptive resin on the non-woven polyolefin fabric represents an important feature of the invention. Thus, when one is concerned with disposable fabrics, production costs are of paramount importance. By avoiding impregnating the fabric and merely laying down a very thin layer of receptive resin on one surface thereof, the least amount of resin is required and the smallest possible surface area for subsequent treatment is available.

As the polymerizable resin, a large variety of commercially available materials can be used, particularly vinyl, acrylic and nitrile resins. As pointed out above, these must be selected such that they will be flexible and non-tacky when cured since they are for use on fabrics and they must be receptive of the subsequent treating agents being used. It is particularly preferred to use a polymerizable composition containing vinyl and acrylic type resin lattices, e.g. Metaglo V–2 since these two types have a good balancing effect in the composition.

As the adhesion improver, a vinyl ether copolymer is preferably used and among particularly suitable copolymers there can be mentioned a copolymer of methyl vinyl ether and maleic anhydride, copolymer of vinyl pyrrolidone and ethyl acrylate, copolymer of vinyl pyrrolidone and styrene, copolymer of vinyl pyrrolidone and vinyl acetate, etc.

The polymerizable composition can also include the usual plasticizers, e.g. dibutyl phthalate. As catalysts there can be mentioned ammonium salts, such as $NH_4H_2PO_4$, metal salts, such as $MgSO_4$ and $MgCl_2$ and organic acids, such as oxalic, citric, tartaric acid, etc.

Since commercially available non-woven polyolefin fabrics melt at about 210° F., it will be appreciated that only polymerizable compositions can be used which have a curing temperature somewhat below the melting point. Thus, for practical purposes, the curing temperature will not go above 200° F.

The polymerizable composition can have pigments added thereto for providing coloring or the fabrics can be printed on after the layer has been applied and cured. When protective layers such as oil and stain repellents are being applied, these are always applied to the coated fabric and can, for instance, be applied by means of spraying, kiss roller, etc.

The invention will now be illustrated by the following non-limitative examples.

Example 1

A 50 gallon batch of paste was prepared consisting of 48 gallons of an aqueous, compounded, resinous binder available from Eastern Color and Chemical Company under the trademark "Metaglo V–2" and 2 gallons of a pigment available from Badische Aniline and Soda under the trademark "Alizerin White RT." The Metaglo V–2 contained 30% by weight of resinous binder while the Alizerin White RT contained 45% by weight $TiO_2$.

This composition was applied to a spun-bonded polyolefin fabric available under the trademark Tyvek having a thickness of 4–5 mls. and a weight of 1.0–1.3 ounces per yard square. The treating composition, having a Brookfield viscosity of about 9,000 to 12,000 was applied to the fabric by means of a screen engraved roller having 36 perforations per inch and a perforation depth of about 9/1000 of an inch at room temperature and a fabric speed of 60 yards per minute. The treated fabric was dried and cured by passing over calendar rollers or through a heated chamber for 1½ minutes at a temperature of 190 to 200° F. About 0.5 to 0.7 ounce of dry solids were deposited per square yard of fabric.

This provides a white fabric which can be printed on or coated with protective layers.

Example 2

A fabric treated in accordance with Example 1 had applied thereto a fluoro-chemical oil and stain repellent available from 3-M Company under the trade name FC 310. This was applied by means of a kiss roller. The treated fabric was dried and was found to have excellent resistance to all kinds of stains such as oil, blood, etc. and was found to be an outstanding fabric for producing disposable coveralls for use in garages, packing and slaughter houses, etc. Garments made with this material will withstand several washings, easily coming clean from blood stains.

Example 3

A 50 gallon batch of paste was prepared consisting of 48 gallons of "Metaglo V-2" containing 30% by weight of resinous binder and 2 gallons of a pigment available from Pigment and Chemicals Corp. under the trade name Fire Orange-T.

This composition was applied to a spun-bonded polyolefin fabric available under the trademark Tyvek having a thickness of 4–5 mls. and a weight of 1.0–1.3 ounces per yard square. The treating composition, having a Brookfield viscosity of about 9,000 to 12,000, was applied to the fabric by means of a screen engraved roller having 36 perforations per inch and a perforation depth of about $8/1000$ of an inch at room temperature and a fabric speed of 60 yards per minute. The treated fabric was dried and cured by passing over calendar rollers or through a heated chamber for 1½ minutes at a temperature of 190 to 200° F. About 0.5 to 0.7 ounce of dry solids were deposited per square yard of fabric.

This produced a light-weight, strong, disposable fabric having a day-fluorescent orange color. The pigment was well bonded by the resinous binder so that it did not tend to lose color in sunlight.

The bright fluorescent orange fabric is useful for many purposes, a particularly valuable use being for making disposable coveralls for carrying in motor vehicles. Such coveralls are inexpensive and can be carried as a very small package in an automobile or truck. When a motorist has difficulties, such as a flat tire, he can wear these disposable coveralls which not only protect his clothes but also provide a safety marking for him greatly reducing the danger of being struck down by a passing motorist.

I claim as my invention:

1. A process for treating a light-weight, non-woven polyolefin fabric having a weight of about 1–1.3 ounces per square yard to make it receptive to treating agents, which comprises applying to one surface of said fabric a very thin layer of a curable composition containing
    (a) a low curing temperature, flexible polymerizable resin comprising a mixture of vinyl and acrylic type resin lattices which is non-tacky when cured and is receptive to treating agents and
    (b) a vinyl ether copolymer as an adhesion improver, and said composition being applied at a Brookfield viscosity of about 9,000 to 12,000 in an amount of about ½ to 2 ounces of solids per square yard of fabric by means of a screen engraved roller having about 36 perforations per inch with perforation depths of about 5 to 10 thousandths of an inch and curing the curable composition.

2. A process according to claim 1 wherein the curing is carried out by heating to a temperature below 200° F.

3. A process according to claim 1 wherein the polymerizable composition contains a pigment.

4. A process according to claim 1 wherein the cured resin layer has an oil and stain repellent applied thereto.

References Cited

UNITED STATES PATENTS

| | | | |
|---|---|---|---|
| 3,502,743 | 3/1970 | Wolf et al. | 117—138.8 E |
| 3,489,597 | 1/1970 | Parker | 117—138.8 F |
| 3,355,322 | 11/1967 | Worrall | 117—138.8 E |
| 2,941,980 | 6/1960 | Robinson | 117—138.8 E |

WILLIAM D. MARTIN, Primary Examiner

M. SOFOCLEOUS, Assistant Examiner

U.S. Cl. X.R.

117—76 R, T, 138.8 E, 139.5 A, CQ, 140 A, 161 UZ